United States Patent [19]
Furuya

[11] Patent Number: 5,452,130
[45] Date of Patent: Sep. 19, 1995

[54] AUTOMOTIVE DISPLAY APPARATUS

[75] Inventor: Yoshiyuki Furuya, Shizuoka, Japan

[73] Assignee: Yazaki Corporation, Tokyo, Japan

[21] Appl. No.: 73,389

[22] Filed: Jun. 9, 1993

[30] Foreign Application Priority Data

Jun. 18, 1992 [JP] Japan .................................. 4-159370

[51] Int. Cl.⁶ .................................................. G02B 27/14
[52] U.S. Cl. ................................... 359/637; 359/613; 359/633
[58] Field of Search ............... 359/631, 633, 630, 637, 359/839, 601, 602, 609, 613

[56] References Cited

U.S. PATENT DOCUMENTS

| 4,163,542 | 8/1979 | La Russa | 359/839 |
| 4,412,723 | 11/1983 | Shafer | 359/637 |
| 4,986,631 | 1/1991 | Aoki et al. | |

FOREIGN PATENT DOCUMENTS 4104233  2/1991  Germany .

*Primary Examiner*—Georgia Y. Epps
*Assistant Examiner*—Thomas D. Robbins
*Attorney, Agent, or Firm*—Armstrong, Westerman, Hattori, McLeland & Naughton

[57] ABSTRACT

Automotive display apparatus in which a display image of the displayer is recognized from an eye range as a virtual image within a displaying range of a first reflector plate through a face plate which is disposed between the first reflector plate and the eye range. An automotive display apparatus according to the present invention comprises: a displayer; a transmissive first reflector plate through which a display light from the displayer passes; a second reflector plate disposed at a position opposing the displayer with the first reflector plate in between, the display light passing through the first reflector plate being reflected on the second reflector plate toward the first reflector plate; and a transmissive face plate disposed between the first reflector plate and an eye range of a driver, an upper portion of the face plate, where the display light from the first reflector plate is reflected to form a ghost-causing virtual image, being inclined rearwardly, the display light reflected on the second reflector plate toward the first reflector plate being reflected on the first reflector plate toward the eye range and passing through the face plate, a display image of the displayer being recognized as a virtual image within a viewing field of the first reflector plate.

5 Claims, 6 Drawing Sheets

5,452,130

AUTOMOTIVE DISPLAY APPARATUS

BACKGROUND OF THE INVENTION

1. Field of the Invention

The present invention relates to an automotive display apparatus, and more particularly to, an automotive display apparatus in which display light from a displayer passes through a transmissive first reflector plate and is reflected on a second reflector plate toward the first reflector plate. Then, the light reflected on the second reflector plate is further reflected on the first reflector-plate toward an eye range, thereby a display image of the displayer is recognized from the eye range as a virtual image within a displaying range of the first reflector plate through a face plate which is disposed between the first reflector plate and the eye range.

2. Description of the Prior Art

A conventional automotive display apparatus described above is shown in FIG. 4, in which a display image of a displayer is indicated as far as possible without making the apparatus larger. In the figure, denoted 11 is a dashboard, in which a light emitting displayer 12 such as a liquid crystal displayer and a fluorescent display tube is installed to display information on driving condition such as a vehicle speed. A transmissive reflector plate 13 is disposed on a display surface side of the displayer 12 to allow the display light from the displayer 12 to pass therethrough. At a position opposing the displayer 12 with the reflector plate 13 in between, a flat or concave mirror 14 is installed so as to form a predetermined offset angle θ between incident and reflected lights.

When the offset angle is 0° and a driver recognizes the display image from the eye range 21 as illustrated in FIG. 5, the driver recognizes an image with a background in which a portion adjacent to a face of the driver is enlarged. Then, when the driver's face is exposed to an external light under such conditions, the contrast of the image is to be reduced, which diminishes a commercial value of the apparatus. To prevent the above phenomenon, the prescribed offset angle θ is provided as shown in FIG. 6, an optical axis of the light reflected on the mirror 14 is absorbed on an inner face of a meter hood 11a to prevent the image of the driver on the mirror 14 from being observed from the eye range 21.

Further, a concave face plate 15 is disposed at a front portion of the dashboard 11 to protect the reflector plate 13 and the mirror 14 and to keep them free from dust, the reflector plate 13 and the mirror 14 otherwise tending to collect dust to deteriorate the quality and recognizability of the image displayed. The face plate 15 may be made of a dark color transparent smoked acrylic resin or the like.

A similar problem arises to the face plate also like the mirror 14, therefore, an upper end of the face plate 15 is inclined on a side opposite to the driver and a center 01 of the concave face is positioned at an upper portion on the drive's side as illustrated in FIG. 7. A reference symbol F is a focus. As described above, the face plate 15 is inclined so that the optical axis of the light reflected by the face plate 15 is absorbed on the inner face of the meter hood 11a, which prevents the image of the driver on the face plate 15 from being recognized from the eye range 21. As clearly understood by comparing FIGS. 8A and 8B to each other, the space in the dashboard (slant line portions in the figure) of the apparatus of which upper end is inclined on the opposite side to the driver, which is shown in FIG. 8A, is smaller than that of the apparatus of which upper end is inclined on the side of the driver in FIG. 8B.

In the structure described above, the display light of the display image is emanated from the displayer and passes through the reflector plate 13 to be reflected on the mirror 14. The thus totally reflected light is further reflected on the reflector plate 13 toward the eye range 21 on the side of the driver, from which the driver recognizes the image.

Therefore, when the reflector plate 13 is observed from the eye range 21, the display image is recognized as a virtual image X in a viewing area A behind the reflector plate 13. The viewing area A is defined in the figure by a first line that passes through the upper end 21U of the eye range 21 and the lower end of the mirror 14a reflected on the reflector plate 13 and a second line that passes through the lower end 21D of the eye range 21 and the upper end of the mirror 14a reflected on the reflector plate 13.

The virtual image X recognized as described above is formed within the range of the mirror 14a reflected in the reflector plate 13 and at a position remote by a distance corresponding to the overall length of the light path, which provides a good remote displaying effect.

With the structure described above, the optical axis of the light reflected on the mirror 14 and the face plate 15 are absorbed on the inner face of the meter hood 11a. However, the directions of the light reflected by the mirror 14 and the center 01 of the face plate 15 approach each other. As a result, the display image X is reflected on a back face of the face plate 15 to form a ghost-causing virtual image X1 as illustrated in FIG. 7 and the image X1 enters the viewing range A1 of the mirror 14a which is reflected on the reflector plate 13 shown in FIG. 6, which allows the image X1 to be recognized from the eye range 21 as a ghost.

When the ghost is observed by the driver, the display image X and the ghost X1 overlap each other, which reduces the contrast of the display image to reduce the recognizability of the display image. Further, the ghost as an unstable image will make the driver irritated, which reduces a commercial value of the apparatus.

An alternative countermeasure is to apply AR coating (non-reflective coating) to a part of the face plate 15 on which the display image X is reflected to reduce the reflected light. However, the countermeasure is costly.

SUMMARY OF THE INVENTION

The present invention has been accomplished to overcome the above drawbacks described above and the object thereof is to provide an automotive display apparatus in which a ghost is prevented from being generated without increasing the space of the apparatus and with low cost.

An automotive display apparatus according to the present invention comprises a displayer; a transmissive first reflector plate through which a display light from the displayer passes; a second reflector plate disposed at a position opposing the displayer with the first reflector plate in between, the display light passing through the first reflector plate being reflected on the second reflector plate toward the first reflector plate; and a transmissive face plate disposed between the first reflector plate and an eye range of a driver, an upper portion of the face plate, where the display light from the first reflector plate is reflected to form a ghost-causing virtual image, being inclined rearwardly, the display light reflected on the second reflector plate toward the first reflector plate being reflected on the first reflector plate toward the eye range and passing through the face plate, a display image of the displayer being recognized as a virtual image within a viewing field of the first reflector plate.

Another automotive display apparatus according to the present invention comprising:

a displayer; a transmissive first reflector plate through which a display light from the displayer passes;

a second reflector plate disposed at a position opposing the displayer with the first reflector plate in between, the display light passing through the first reflector plate being reflected on the second reflector plate toward the first reflector plate; and a transmissive face plate disposed between the first reflector plate and an eye range of a driver, an upper portion of the face plate, where the display light from the first reflector plate is reflected to form a ghost-causing virtual image, having a concave face, the display light reflected on the second reflector plate toward the first reflector plate being reflected on the first reflector plate toward the eye range and passing through the face plate, a display image of the displayer being recognized as a virtual image within a viewing field of the first reflector plate.

The automotive display apparatus according to the present invention described above is characterized in that the upper portion of the face plate is positioned at a point where a line connecting an upper end of the virtual image of the display image and a lower end of the virtual image of the second reflector plate crosses the face plate or below the point.

With the structure described above, even if the display image is reflected on the rear face of the upper end portion of the face plate, this upper end portion is inclined rearwardly so that the position of the virtual image which is formed after reflected on the upper end portion moves at a position upwardly beyond the viewing area of the virtual image of the second reflector plate.

Further, the reflecting face of the upper end portion is formed as a concave face to form an enlarged display image at a long distance with reduced luminance after reflected on the upper end portion.

As a result, the virtual image is not positioned as a ghost within the viewing range, and even if recognized by the driver, the virtual image will not be recognized as a ghost due to its low luminance.

BRIEF DESCRIPTION OF THE DRAWINGS

The present invention will be more apparent from the ensuring description with reference to the accompanying drawing wherein.

DETAILED DESCRIPTION OF PREFERRED EMBODIMENTS

An embodiment of an automotive display apparatus according to the present invention will be explained with reference to FIG. 1. In the figure, components identical with those of FIG. 2, in which an apparatus is illustrated, are given like reference symbols or numerals and the explanation thereof will be omitted.

Figure 1:
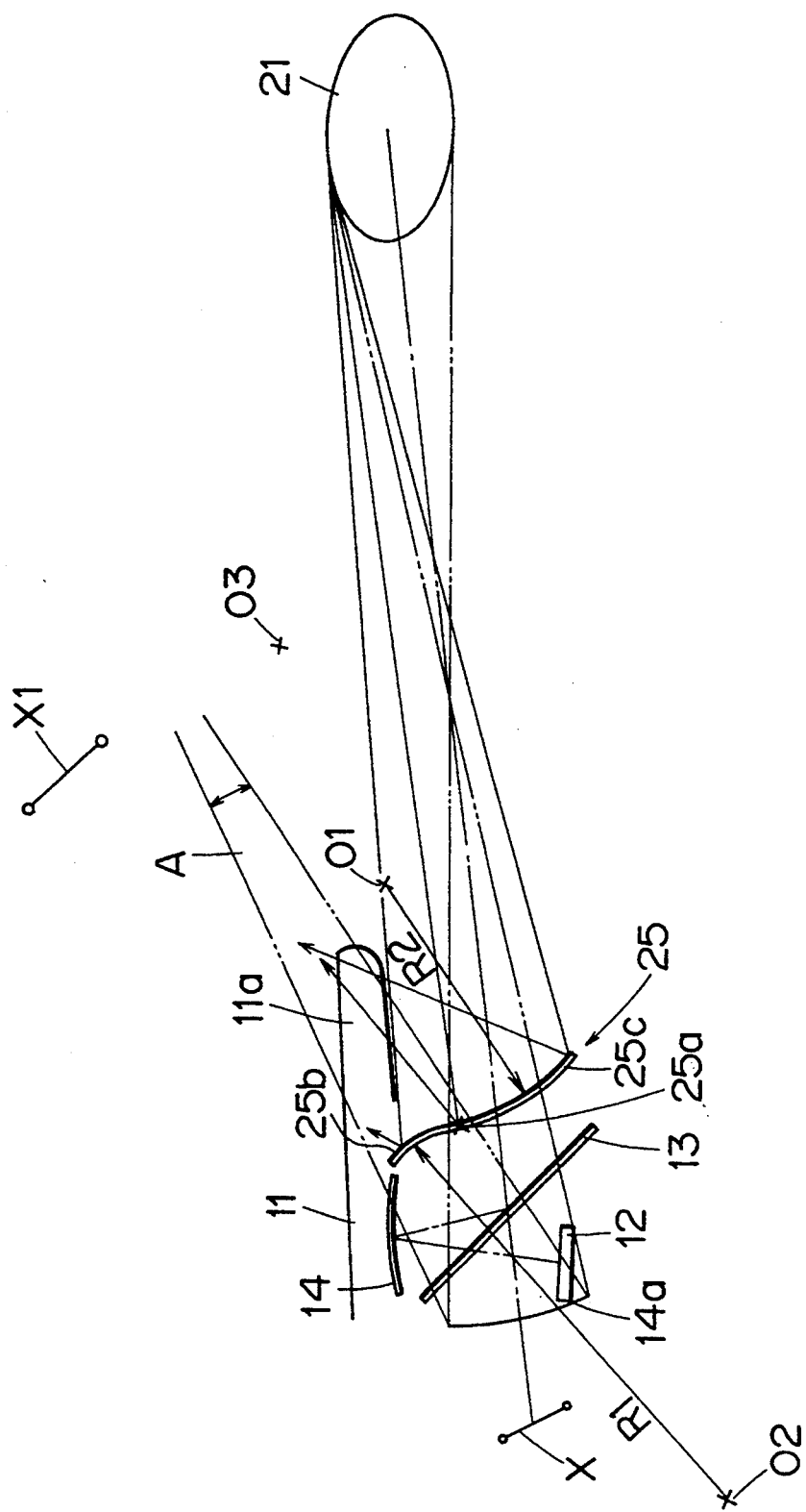
FIG. 1 is a schematic side view of the automotive display apparatus according to the present invention.
Figure 2:
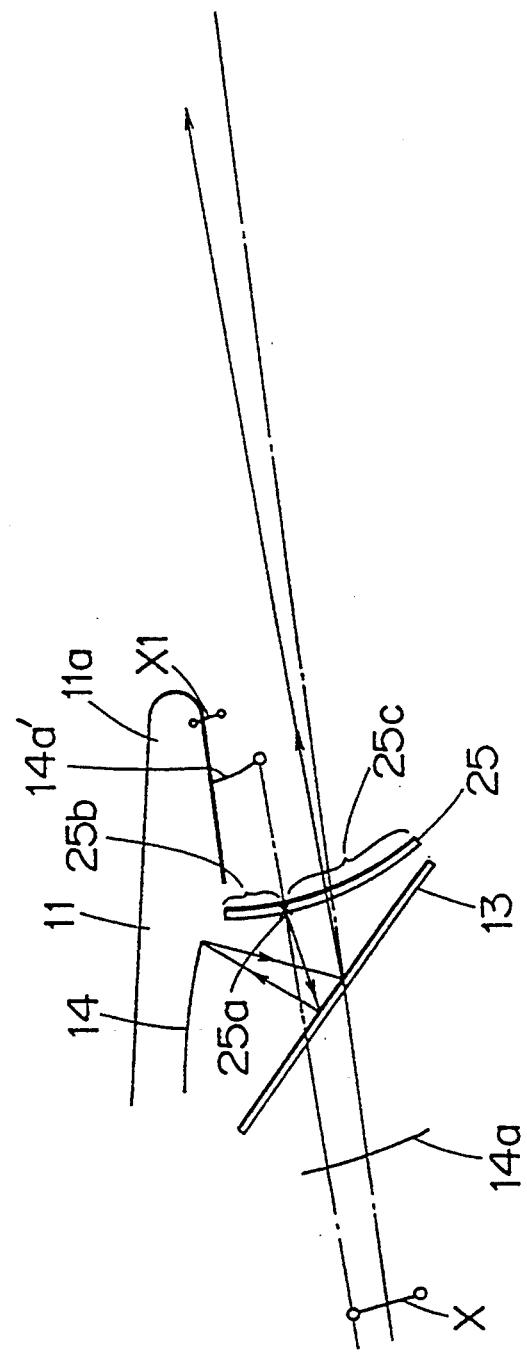
FIG. 2 is a drawing for explaining a method of determining the inflection point shown in FIG. 1.

In FIG. 1, a face plate 25 is provided with an upper end portion 25b and a lower end portion 25c with different shape from each other and these two portions are divided at an inflection point 25a. The lower end portion 25c has a center O1, a radius R2, and a shape similar to the conventional concave face plate 15. The upper end portion 25b has a center O2, a radius R1, and a shape of a convex, on the contrary to the lower end portion 25b. Then, the center of the radius R1 of the upper end portion 25b is determined so as to satisfy the conditions described below.

The center of the radius R1 is determined so that the direction in which the ghost-causing virtual image is formed by reflecting the display image (virtual image) X on the concave face of the face plate 25 is changed so that the ghost is formed at a position upwardly beyond the viewing area A1 of the reflected image of the mirror 14 which is recognized from the eye range 21. Therefore, the ghost is formed at a portion which is not recognized from the eye range 21.

When the distance between the position where the ghost-causing virtual image is formed and the mirror 14a is determined so as to be equal to the radius R of the mirror 14 (the distance between the virtual image of the mirror 14a and the center O3), even if the ghost-causing virtual image is observed from the eye range 21, the image is enlarged with a large scale and the luminance thereof becomes small. As a result, it becomes difficult to recognize the ghost-causing virtual image as a visible image.

The inflection point 25a is positioned at a point where a line crossing an upper end of the display image X and a lower point of the virtual image 14a reflected on the face plate 25 or below this line. Then, the inflection point 25a divides the face plate 25 into the upper end portion 25b and the lower end portion 25c. The upper end portion 25b provides an area to reflect the display image X on the face plate and the reflector plate 13, and to finally reflect the image X on the mirror 14. On the other hand, the lower end portion 25c is provide an area not to finally reflect the image X on the mirror 14 even though the display image X is reflected on the face plate 25 and the reflector plate 13.

Figure 3:
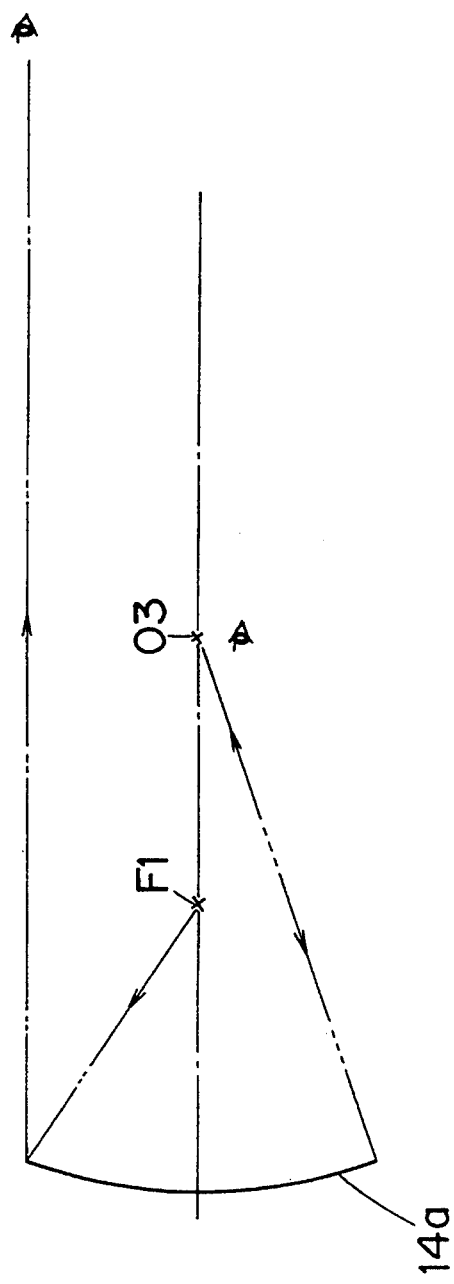
FIG. 3 is a drawing for explaining the reason why a ghost-causing virtual image is not recognized.
Figure 4:
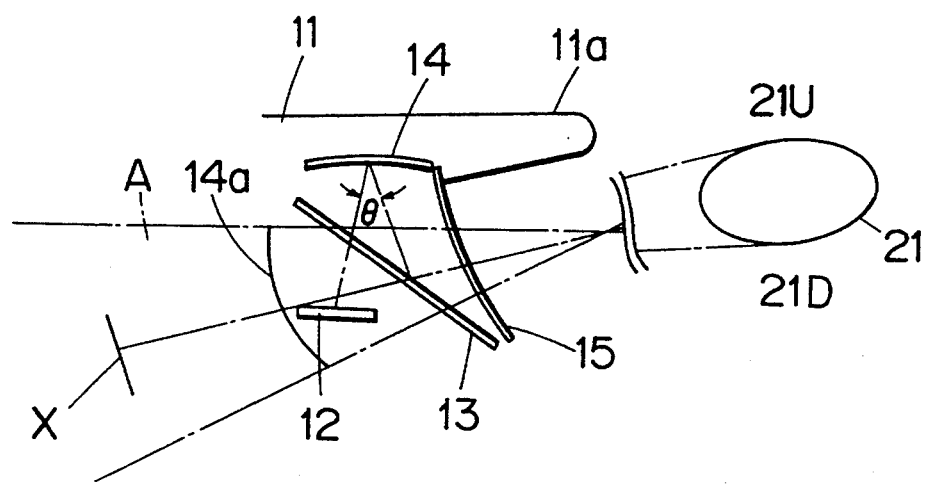
FIG. 4 is a schematic side view of a conventional automotive display apparatus.
Figure 5:
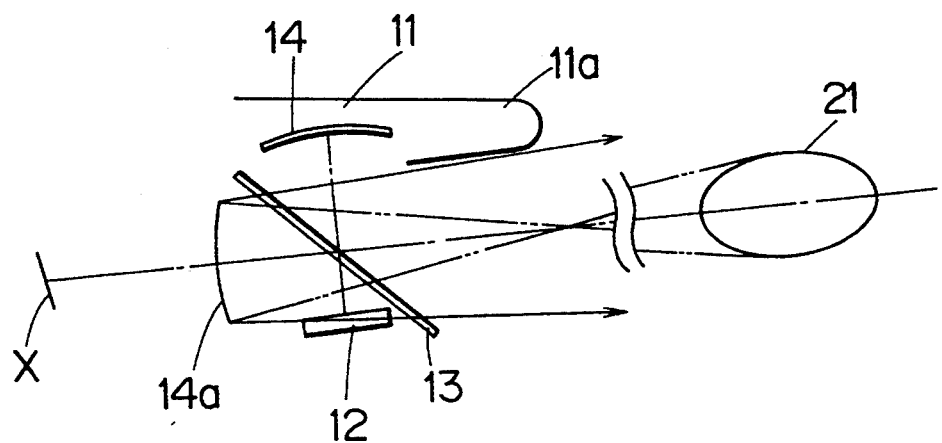
FIG. 5 is a drawing for explaining the problem which arises when no offset angle is provided in the mirror of the automotive display apparatus in FIG. 4.
Figure 6:
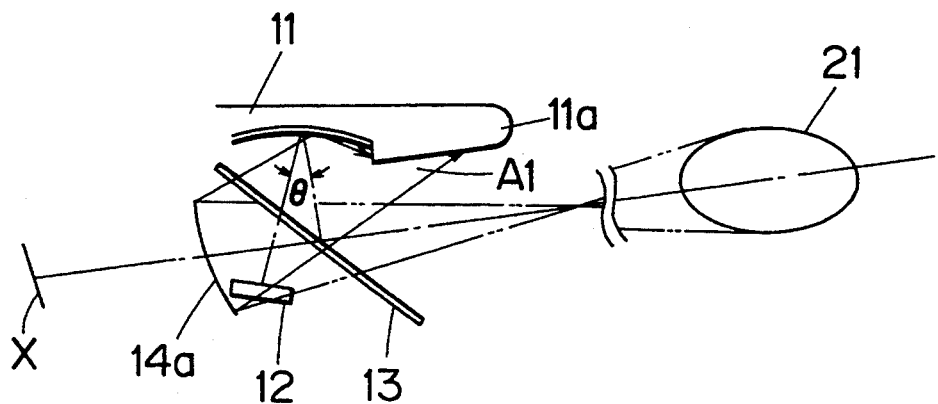
FIG. 6 is a drawing for showing the effect of the offset angle shown in FIG. 4.
Figure 7:
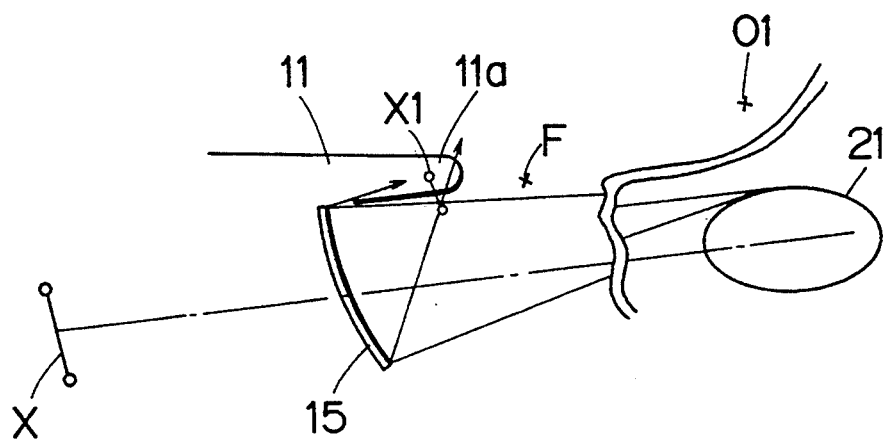
FIG. 7 is a drawing for explaining the ghost-causing virtual image generated by the face plate.
Figure 8A:
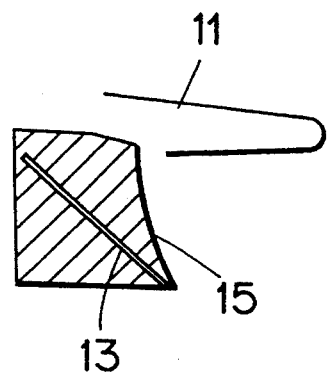
FIGS. 8A and 8B are drawings for explaining the effect of the inclined face plate.
Figure 8B:
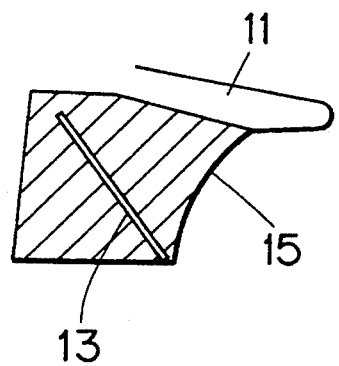

The radius R1 of the upper end portion 25b is determined in such a manner that the position of the ghost-causing virtual image which is formed by the reflection at the upper end portion 25b of the face plate is substantially equal to the radius R of the mirror 14 as described above. In such a case, when the distance between the virtual image of the mirror 14a and the eyes of the driver is substantially equal to the radius R of the mirror 14 as shown in FIG. 3, and an object positioned at the center O3 of the virtual image 14a of the mirror 14 is observed through the mirror 14, the object at the center O3 is enlarged and is reflected on the front face of the mirror 14. As a result, the object is not recognized as an image. Further, if the eyes are positioned at an infinite point and the driver observes the mirror 14, light from an object positioned at the focus F1 is reflected as parallel light so that an image is not formed. As a result, the image can not be recognized from the position of the driver's eyes.

With the structure described above, the display light is projected from the displayer 12 and is reflected on the mirror 14 through the reflector plate 13. The thus, totally reflected light is further reflected by the reflector plate 13 toward the eye range 21 on the driver seat side from which a driver observes.

As a result, when the reflector plate 13 is observed from the eye range 21, the display image X is recognized as a virtual image in the viewing range A behind the reflector plate 13. The display image X which is recognized as described above is displayed at a long distance in accordance with the light path in the range of the mirror 14a which is reflected on the reflector plate 13, resulting in good recognizability of the image.

In such a case, the ghost-causing virtual image, which is formed when the display image X is reflected on the concave face of the upper end portion 25b of the face plate 25, the reflector plate 13, and the mirror 14, is enlarged at a long distance and at a position upwardly beyond the reflecting viewing area of the mirror 14 from the eye range 21 and is formed at a position having the same distance to the center O3 of the mirror with decreased luminance of the image.

As a result, when the driver ducks below a boundary, which is considerably lower than the eye range 21, the ghost is recognizable, but, the driver will not recognize the ghost from the eye range 21 under the normal condition, which improves the quality of the display image X to increase the recognizability.

Meanwhile, in the embodiment described above, the upper end portion 25b of the face plate 25, which is an upper portion from the inflection point, forms a concave face with respect to the display image X and the end portion 25b is formed so as to have the center and the radius such that the ghost-causing virtual image is formed at the distance equal to the radius of the mirror and at a position upwardly beyond the range that the reflected virtual image 14a of the mirror 14 is visible from the eye range 21. However, it is also possible that, at least the upper end portion 25b is rearwardly inclined to form the ghost-causing virtual image at a position upwardly beyond the range that the reflected virtual image 14a of the mirror 14 is visible from the eye range 21. Further, it is possible that at least the upper end portion 25b is formed as a concave portion to form an enlarged ghost-causing virtual image with low luminance at a long distance, which also eliminates the problem on the ghost.

As described above, in the present invention, the position of the virtual image of the display image, which is reflected at the upper portion of the face plate and formed as an image, moves at a position upwardly beyond the viewing area of the virtual image of the second reflecting member, or the virtual image of the display image which is formed after reflected on the upper portion of the face plate is enlarged at long distance with reduced luminance so that the virtual image is not positioned within the viewing range as a ghost-causing virtual image. As a result, the driver will not recognize the ghost and even if the image is recognized by the driver, the luminance thereof is reduced so that he or she does not recognize the image as a ghost, which provides an automotive display apparatus in which a ghost is prevented from being generated with low cost and without additional space for the apparatus.

What is claimed is:

1. An automotive display apparatus comprising:
   a displayer;
   a transmissive first reflector plate through which a display light from said displayer passes;
   a second reflector plate disposed at a position opposing said displayer with said first reflector plate in between, the display light passing through the first reflector plate being reflected on said second reflector plate toward the first reflector plate; and
   a transmissive face plate disposed between the first reflector plate and an eye range of a driver, said display light reflected on the second reflector plate toward the first reflector plate being reflected on said first reflector plate toward the eye range and passing through the face plate, a display image of the displayer being recognized as a virtual image within a viewing field of said first reflector plate,
   characterized in that
   said face plate is provided with an upper end portion and a lower end portion with different shapes from each other, wherein these two portions are divided at an inflection point; and
   said upper portion of said face plate, where the display light from the first reflector plate is reflected to form a ghost-causing virtual image being inclined rearwardly away from the driver such that the ghost-causing virtual image is formed at a position beyond the range where the reflected virtual image of the second reflector plate is visible from the eye range.

2. An automotive display apparatus comprising:
   a displayer;
   a transmissive first reflector plate through which a display light from said displayer passes;
   a second reflector plate disposed at a position opposing said displayer with said first reflector plate in between, the display light passing through the first reflector plate being reflected on said second reflector plate toward the first reflector plate; and
   a transmissive face plate disposed between the first reflector plate and an eye range of a driver, said display light reflected on the second reflector plate toward the first reflector plate being reflected on said first reflector plate toward the eye range and passing through the face plate, a display image of the displayer being recognized as a virtual image within a viewing field of said first reflector plate,
   characterized in that
   said face plate is provided with an upper end portion and a lower end portion shaped differently from each other, wherein these two portions are divided at an inflection point; and
   said upper portion of said face plate, where the display light from the first reflector plate is reflected to form a ghost-causing virtual image, having a concave face, to form the ghost, causing virtual image with low luminance at a long distance.

3. An automotive display apparatus as claimed in claim 1 or 2, wherein said upper portion of the face plate is positioned at a point where a line connecting an upper end of said virtual image of the display image and a lower end of the virtual image of the second reflector plate crosses said face plate or below said point.

4. An automotive display apparatus as claimed in claim 1 or 2, wherein said second reflector plate includes a concave mirror, and a distance between a position, where the ghost-causing virtual image is formed, and said virtual image of the second reflector plate is equal to a radius of said second reflector plate.

5. An automotive display apparatus comprising:
- a displayer;
- a transmissive first reflector plate through which a display light from said displayer passes;
- a second reflector plate disposed at a position opposing said displayer with said first reflector plate in between, the display light passing through the first reflector plate being reflected on said second reflector plate toward the first reflector plate; and
- a transmissive face plate disposed between the first reflector plate and an eye range of a driver; said transmissive face plate having an upper portion where the display light from the first reflector plate is reflected to form a ghost-causing virtual image, having a center of curvature disposed on a side of said face plate opposite the driver, and a central axis connecting said center of curvature and a central part of said upper portion of said face plate, said central axis connecting said center of curvature and a central part of said upper portion of said face plate being inclined such that it extends above the eye range of the driver, said display light reflected on the second reflector plate toward the first reflector plate being reflected on said first reflector plate toward the eye range and passing through the face plate, a display image of the displayer being recognized as a virtual image within a viewing field of said first reflector plate.

* * * * *